Figure 1:
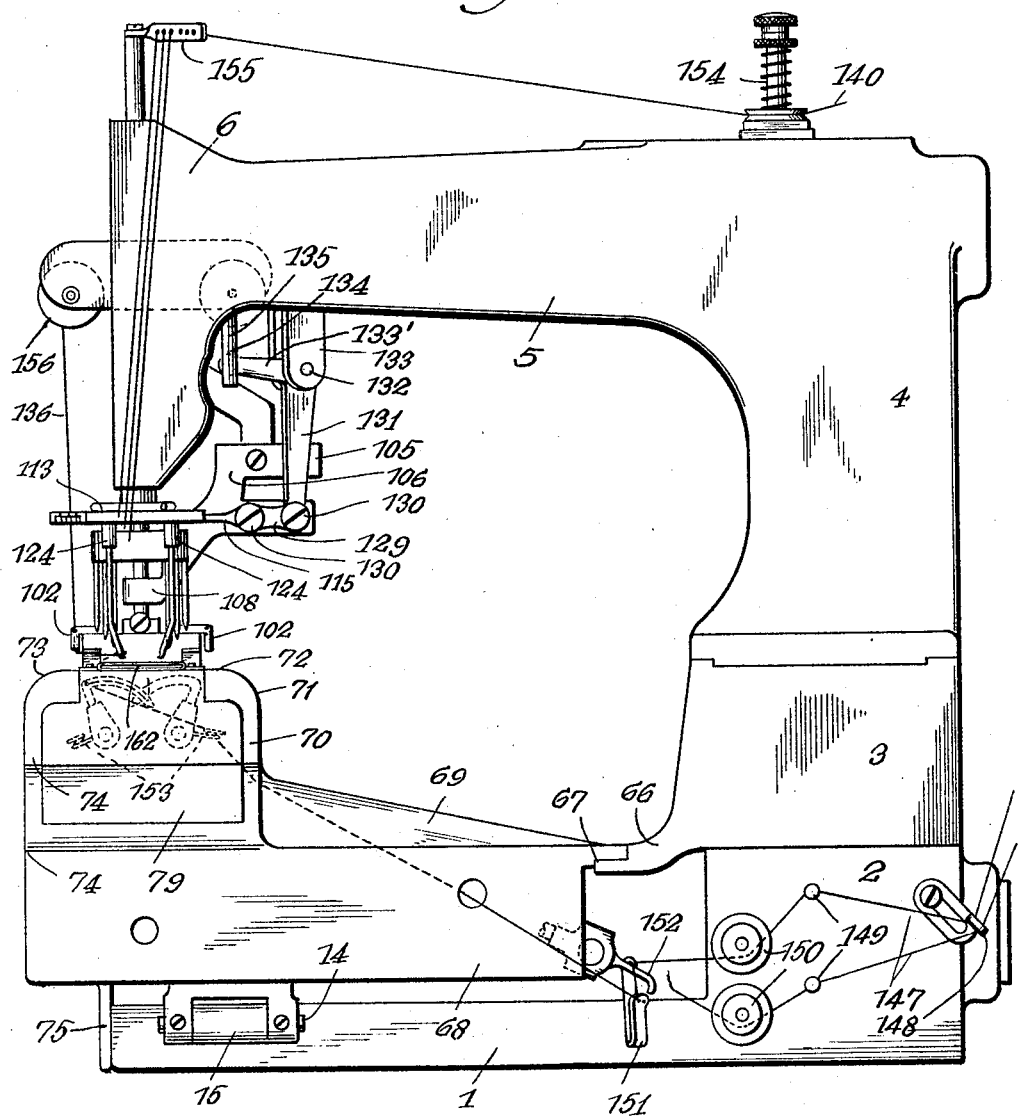

J. P. WEIS.
SHOULDER STRAP SEWING MACHINE.
APPLICATION FILED AUG. 6, 1917.

1,327,646.

Patented Jan. 13, 1920.
7 SHEETS—SHEET 1.

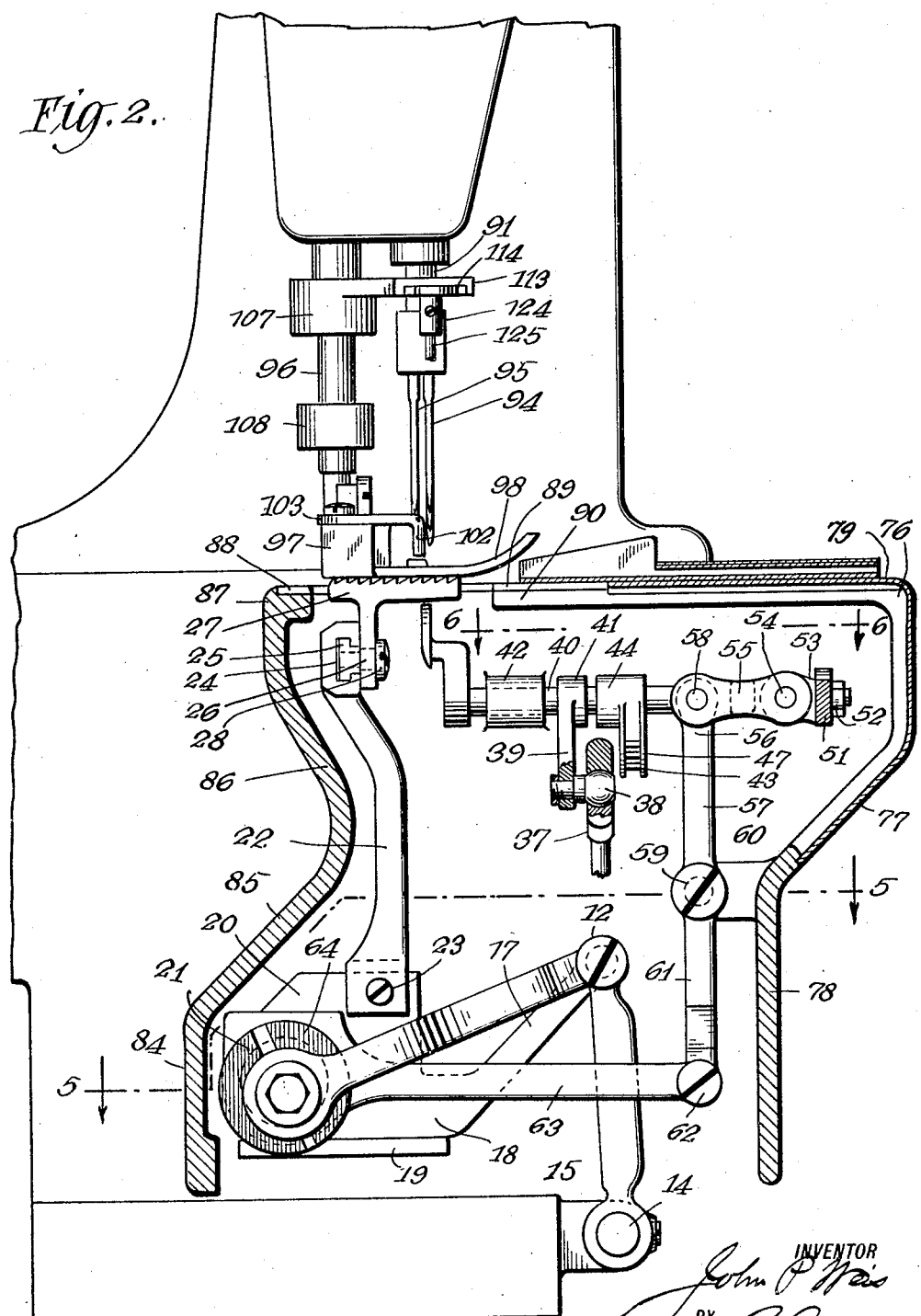

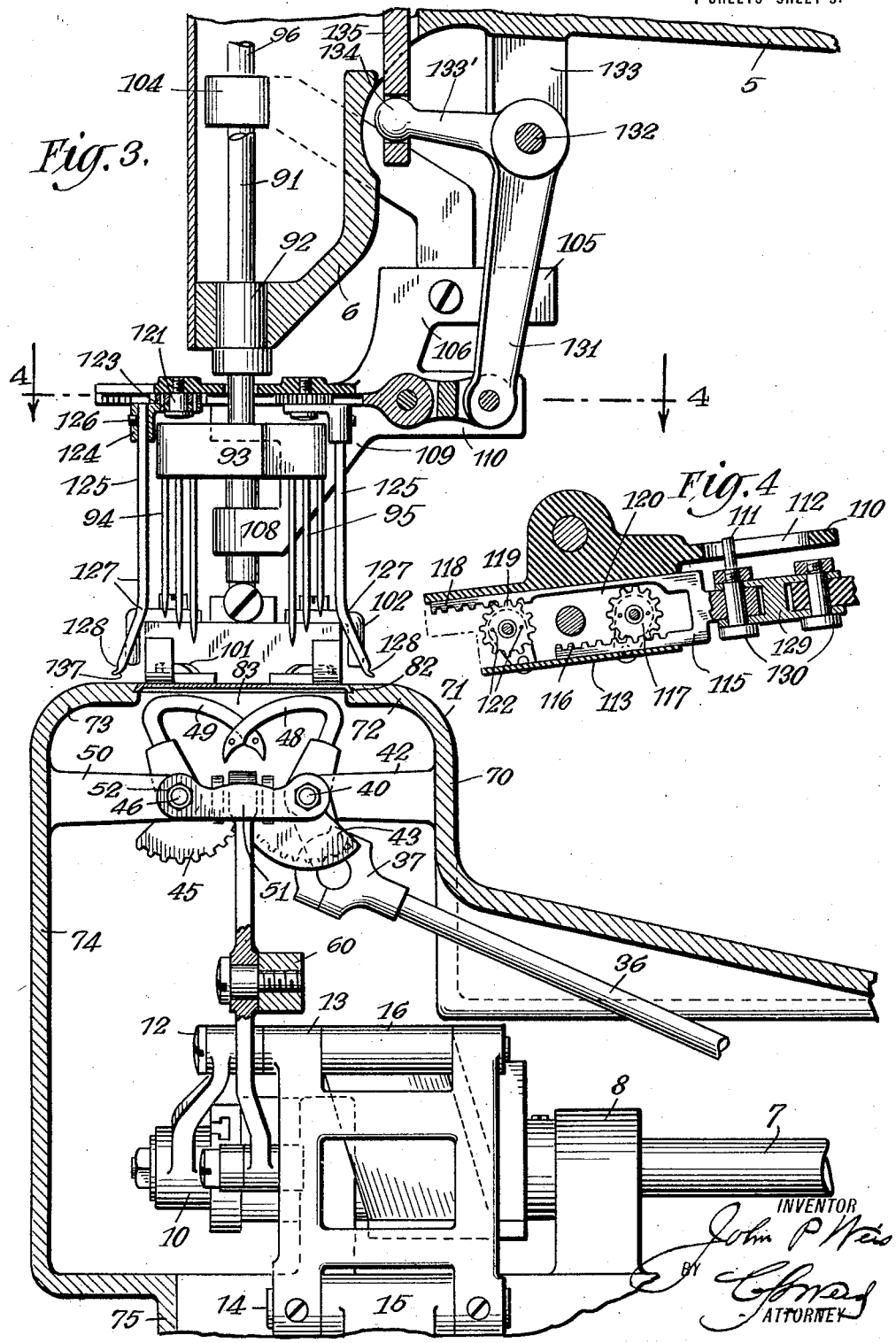

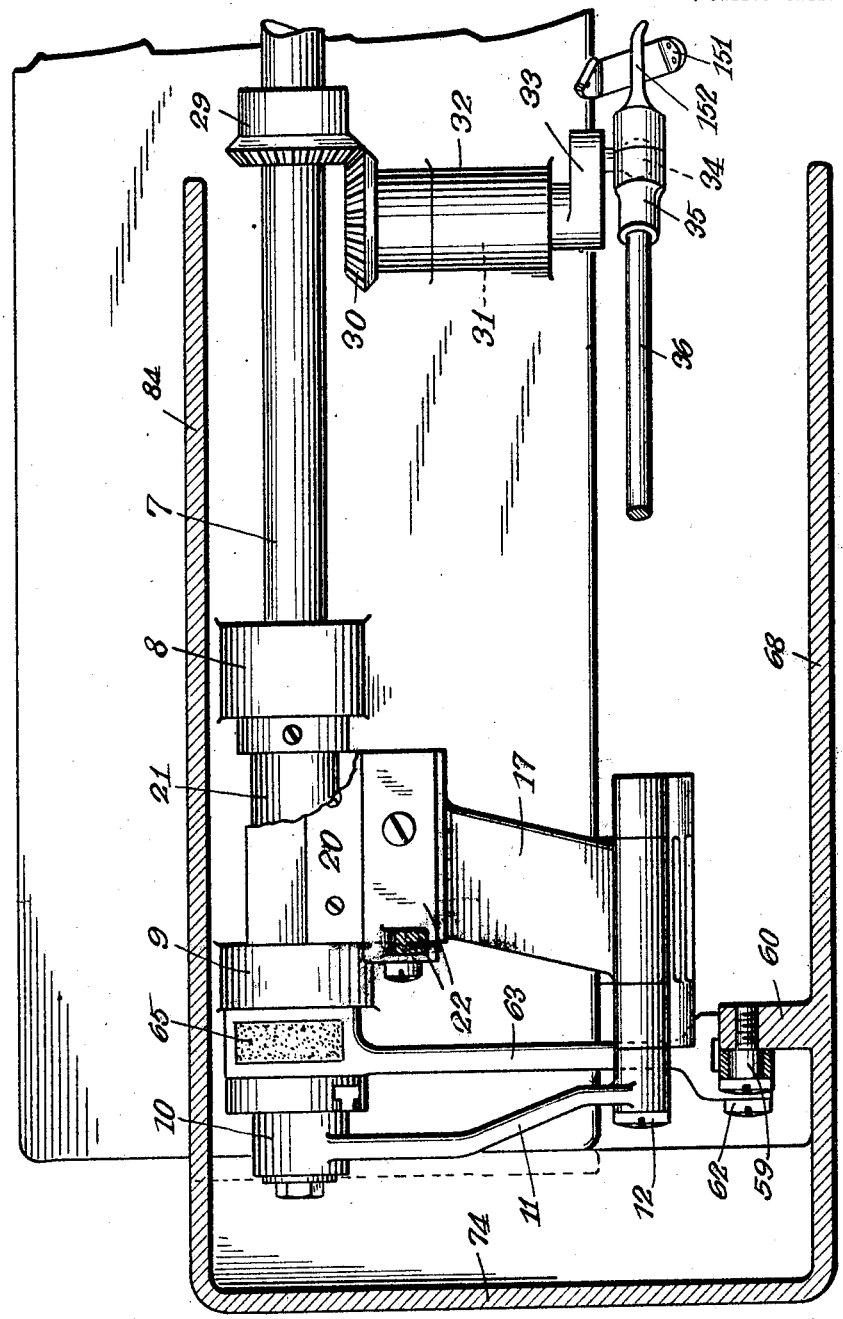

J. P. WEIS.
SHOULDER STRAP SEWING MACHINE.
APPLICATION FILED AUG. 6, 1917.
1,327,646.
Patented Jan. 13, 1920.
7 SHEETS—SHEET 5.
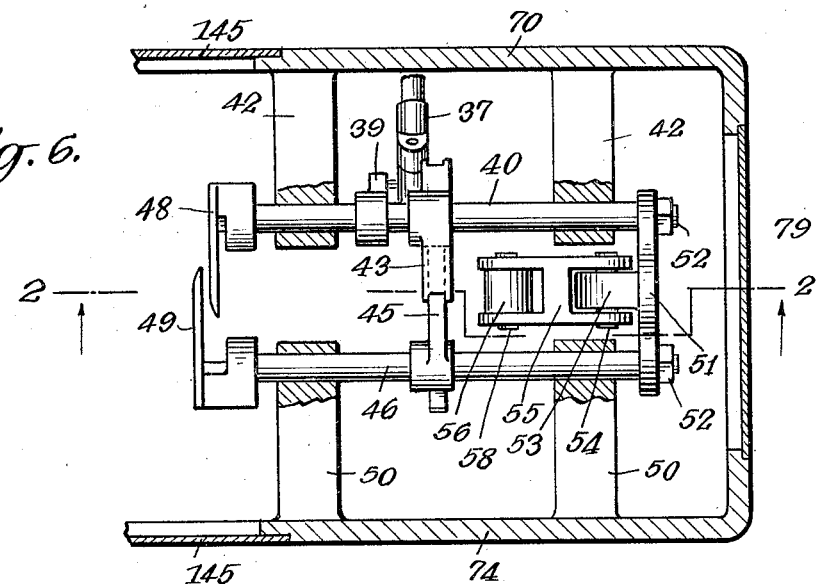
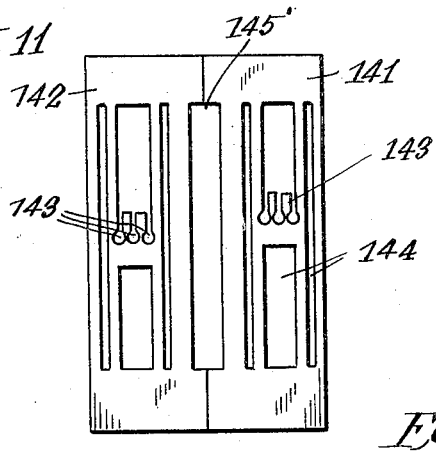
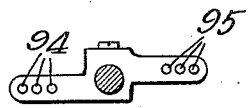
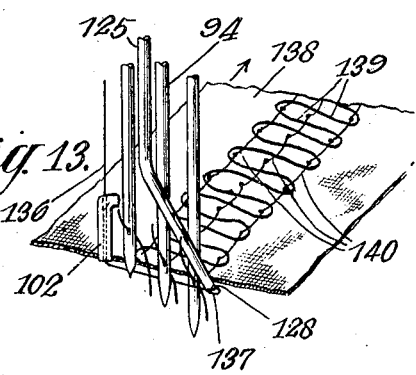
INVENTOR
John P. Weis
BY
ATTORNEY J. P. WEIS.
SHOULDER STRAP SEWING MACHINE.
APPLICATION FILED AUG. 6, 1917.
1,327,646.
Patented Jan. 13, 1920.
7 SHEETS—SHEET 6.
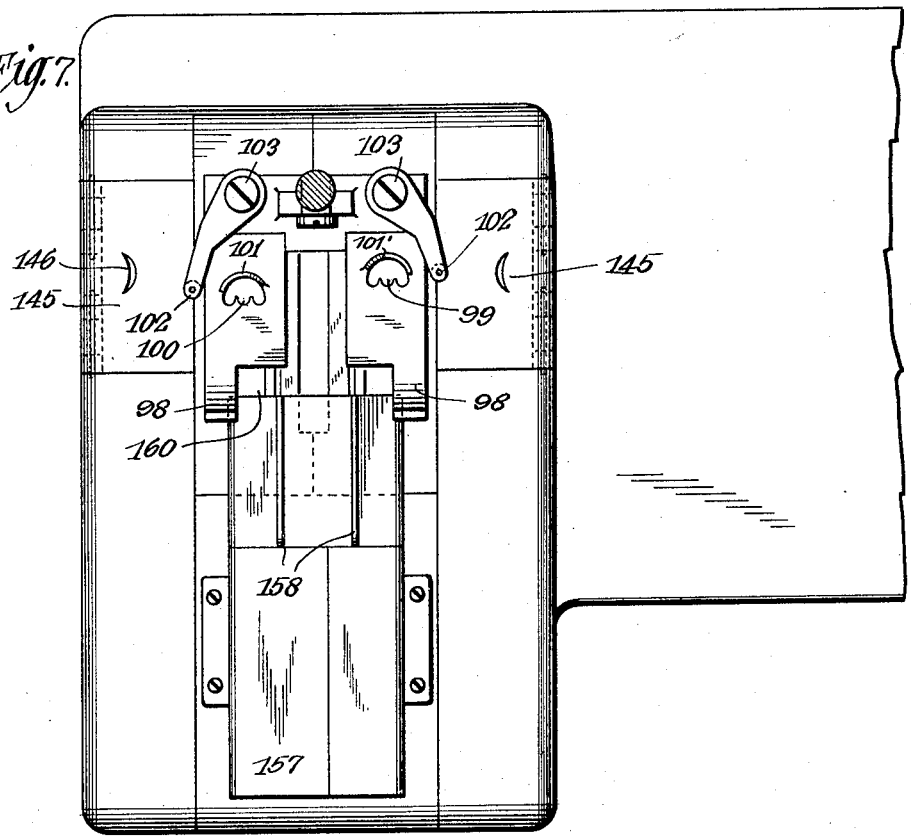
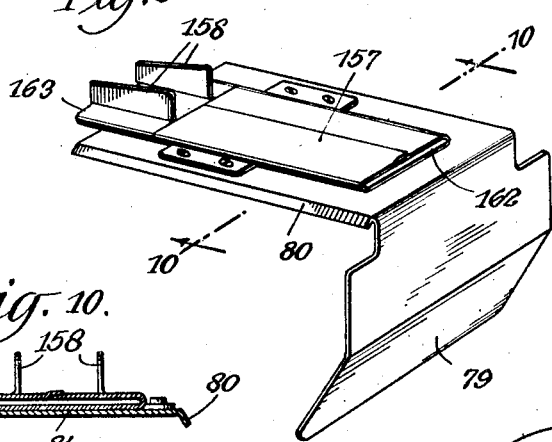
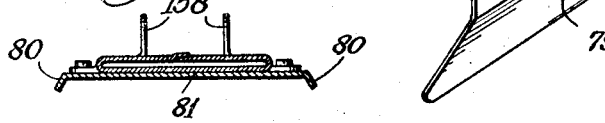
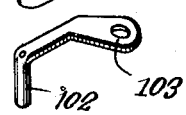

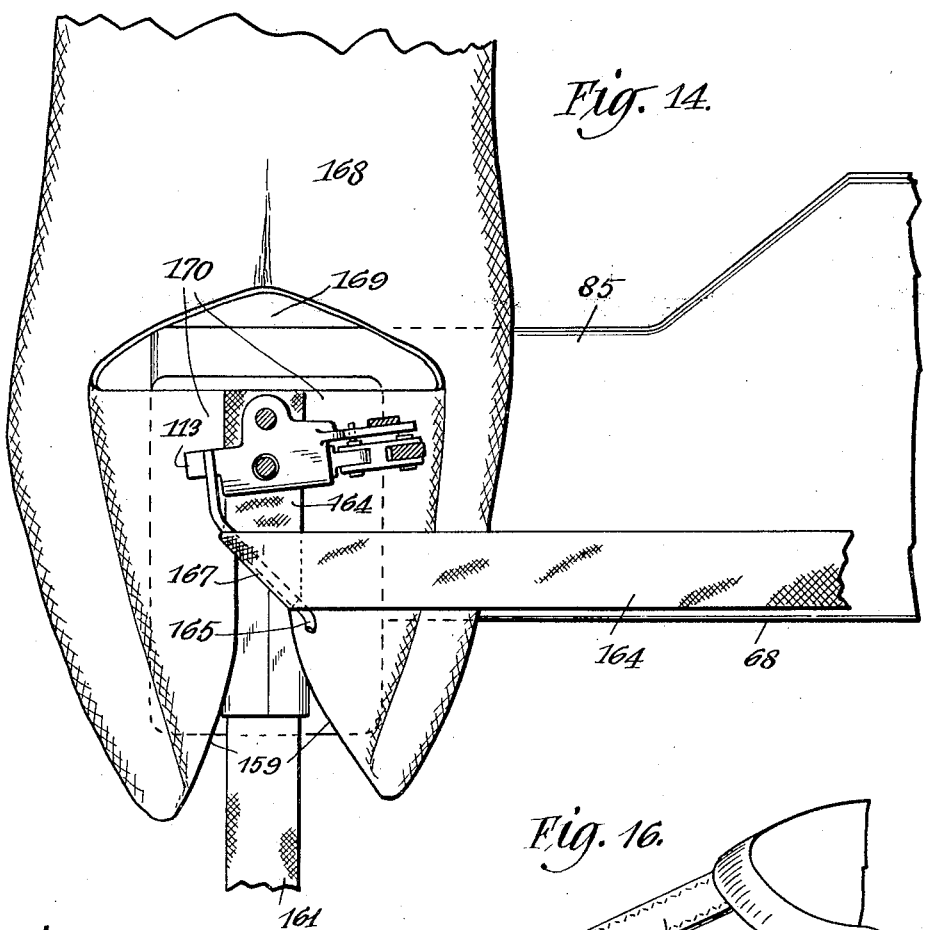
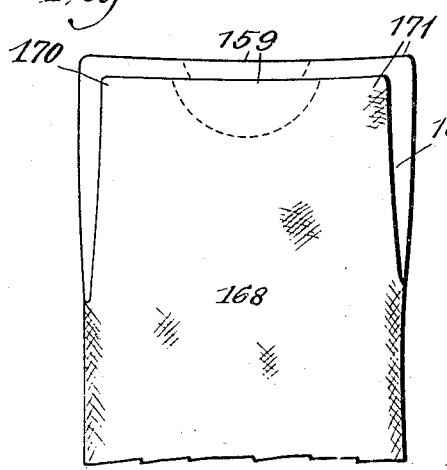
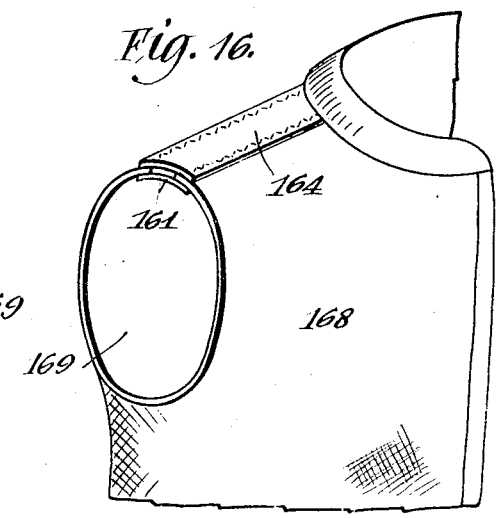

UNITED STATES PATENT OFFICE.

JOHN P. WEIS, OF NYACK, NEW YORK, ASSIGNOR, BY MESNE ASSIGNMENTS, TO METROPOLITAN SEWING MACHINE CORPORATION, OF DOVER, DELAWARE, A CORPORATION OF DELAWARE.

SHOULDER-STRAP-SEWING MACHINE.

1,327,646.   Specification of Letters Patent.   Patented Jan. 13, 1920.

Application filed August 6, 1917. Serial No. 184,567.

*To all whom it may concern:*

Be it known that I, JOHN P. WEIS, a citizen of the United States, residing at Nyack, in the county of Rockland and State of New York, have invented certain new and useful Improvements in Shoulder-Strap-Sewing Machines, of which the following is a specification.

This invention relates to sewing machines and more particularly to a machine particularly adapted for stitching shoulder straps to shirts and the like and is especially useful in the producing of seam structures such as those shown in my co-pending application, Serial No. 145,826, filed February 1, 1917.

Some of the principal objects of the invention are the provision of an improved machine which will permit freedom in the handling of undergarments during the application of the shoulder straps thereto which unite the front and back of the garment, and which will permit the arm holes of the undergarments to partly encircle a portion of the body of the machine and so permit the goods to be drawn in from the rear of the machine and then fed toward the garment, thus obviating the breaking of the threads forming the stitches at the finish of the stitching operation;

To provide a machine with practically no mechanism in back of the stitching position and to have the work plate of the machine extended vertically from the bed plate thereof to provide a post for the convenience of handling the work to be stitched;

To provide a machine with the looper and feeding mechanism located in front of the needles to permit freedom of the work immediately after stitching and to provide a large working space under the arm of the machine for convenience in handling the garment;

To provide a sewing machine with spaced multiple needles for forming a covering stitch on top and bottom so as to cover the raw edges of the goods;

To provide an improved chain stitch sewing machine having two sets of multiple needles, with each set of which a single thread carrying finger coöperates, whereby two spaced rows of ornamental chain stitches are obtained;

To provide an improved top thread handling mechanism having a small circular motion around the needles and the rise and fall thereof with the presser foot so that the fingers of such mechanisms cannot be damaged by the lifting of the presser foot;

To provide a sewing machine with spaced sets or groups of multiple needles and coöperating stitch forming means including a single thread carrying finger coöperating with each set of needles thereby to obtain two spaced rows of disconnected ornamental covering stitches on top and bottom of the work, and in which also each thread carrying finger will pick up the top ornamental covering thread at each cycle of the machine and carry a loop of this thread around the path of all the needles of its set so that the thread is stitched down at each reciprocation of the needles.

In the drawings accompanying and forming a part of this specification,

Figure 1 is a front view of the machine showing a portion of the looper mechanism located in the vertical projection forming the cloth plate and the multiple spaced needles for forming the ornamental stitches in conjunction with the looper thread carried by the loopers and the top covering thread carried by the thread carrying fingers, which is stitched down on top of the work by the needle threads; Fig. 2 is a left hand end view of the machine and the end wall of the cloth plate, certain parts being taken on line 2—2 of Fig. 6 looking in the direction of the arrows and shows the arrangement of the feeding and looper mechanism. The guide for guiding the bottom strip is also shown in section and the top thread carrying finger is broken away to clearly show the juxtaposition of the needles; Fig. 3 is a front view of the machine partly in section, the top of the frame wherein the needle bar driving means operates being broken away to show a portion of the needle and presser bar, and means for giving movement to the top thread carrying fingers being shown partly in section to clearly illustrate the manner in which they operate. The front wall of the cloth plate is broken away to show the looper and feeding mechanism; Fig. 4 is a sectional detail view of the top thread carrier mechanism taken on line 4—4, Fig. 3 looking in the direction of the arrows; Fig. 5 is a top plan partly sectional view of the machine base, the cloth plate being sectioned on the line 5—5 Fig. 2 looking in the direction of the arrows; Fig. 6 is a top plan partly sectional view of the vertical portion of the cloth plate taken on line 6—6 Fig. 2 and shows the manner in which the loopers are connected for their respective movements; Fig. 7 is a top plan view of the cloth plate, the presser foot, strip guide, and thread guides for the top covering thread; Fig. 8 is a perspective detail view showing the slide plate with the strip guide and edge guides for the work; Fig. 9 is a detail perspective view of one of the ornamental thread guides; Fig. 10 is a sectional view of the slide plate with strip and work guides applied thereto, taken on line 10—10 Fig. 8 looking in the direction of the arrows; Fig. 11 is a top plan view of the throat plates; Fig. 12 is a detail view of the needle holder; Fig. 13 is a perspective view of one set of needles and thread carrying finger intended to illustrate how the finger operates to form the covering stitch on top of the work; Fig. 14 is a plan view of the bottom part of the machine, the top arm being removed clearly to show the manner in which the top and bottom strips are applied to the shoulder portions of the garment and shows clearly how the garment is drawn in from the rear of the machine so as to feed it off a vertical portion of the cloth plate as the stitching proceeds; Fig. 15 is a view showing the body of a shirt ready for the stitching operation; and Fig. 16 shows the finished work with the straps applied thereto.

Similar characters of reference indicate corresponding parts in the several figures of the drawings.

In the drawings, the base of the machine 1, has a vertical trunk 2 and an extension 3 secured thereto to lift the arm 4, which is of the usual hollow form having an overhanging arm 5 in which operates the usual top shaft. The arm 5 terminates in a head 6. The top shaft (not shown) and the operating connections between top and bottom shafts, which latter operates in the trunk, are omitted as they form no part of the present invention. The bottom shaft 7 operates in suitable bearings in the trunk 2 of the base 1 and also in bearings 8 and 9 located on the forward end of the base 1. This shaft carries at its forward end the adjustable feed actuating crank 10 for regulating the stroke of the feed. The usual feed actuating connection 11 connects to the shaft 12, carried in the top of the rocker frame 13. This rocker frame is pivoted by shaft 14 to the machine base 1, which is provided with lug 15 and wherein this shaft 14 rocks. Feed bar 16 is pivoted to the shaft 12 and has an arm 17 which terminates in an enlarged portion 18 having a plate 19 secured to the bottom thereof and an overhanging portion 20, which rests upon the feed lift eccentric 21. The overhanging portion 20 and the plate 19 form a fork in which the eccentric 21 operates. A vertical post 22 is secured to the feed bar at 23, and the upper end of this post is provided with a T-slot 24 in which are secured T-blocks 25 which form a clamping means for the shank 26 of the feed dog 27. A screw 28 tapped into the block 24 and passing through a slot in the feed dog shank 26 permits lateral and vertical adjustment of the feed dog. Secured to the shaft 7 is a gear 29 driving a companion gear 30 which is carried by a shaft 31 operating in a bearing 32 at right angles to the shaft 7. A crank 33 secured to this shaft 31 carries a ball 34 operating in a ball socket 35 to give movement to a rod 36 which extends forward and has a ball socket 37, at its other end for the ball 38 (see Fig. 2) carried by an arm 39 secured to the looper shaft 40 as at 41. This looper shaft operates in suitable bearings 42, (see Fig. 6), and a segmental gear 43 is secured to the looper shaft 40 as at 44. This gear coöperates with a pinion gear 45 carried by the opposite looper shaft 46 so as to rock said shaft in a direction opposed to the shaft 40. Segmental gear 43 is provided with flanges 47 overlapping the side walls of the gear 45 closely. Each of the shafts 40 and 46 carry loopers 48 and 49 which are provided with the usual thread eyes and grooves to carry the threads so as to form a covering ornamental stitch on the bottom of the work. These loopers are shown located in opposition, that is, the pointed end of one extends toward the pointed end of the other whereby the movement of the loopers is balanced. These loopers moreover are shown separately mounted, although driven by the same driving means. That is to say, both loopers are not carried by the same shaft or carrier. One of the advantages of this construction is that the loopers can be so supported that the pivotal axis of each looper is substantially intersected by the vertical axis directly between and substantially equidistant from the two outer needles, of its coöperating set of needles, and this enables the formation of the widely spaced rows of disconnected ornamental stitches, which could not be obtained were the loopers mounted upon the same shaft.

From the foregoing it will be understood that the looper shaft 40 is rocked in the bearings 42 while the looper shaft 46 is rocked in its bearings 50. These looper shafts 40 and 46 are reduced at their outer ends to provide a shoulder to receive a yoke 51 and are threaded at their extreme ends to receive nuts 52 which limit the end movement of the yoke 51, while permitting the shafts to rock in the yoke. This yoke is provided with a projecting lug 53 (see Fig. 6) drilled to receive pin 54 to connect a link 55 to the lug 53. The other end of this link is connected to the end 56 of a lever 57 (see Fig. 2) by a pin 58. This lever 57 rocks on a stud 59 supported by a bracket 60. The other arm 61 of this lever 57 is connected as at 62 by means of a shoulder screw and a connection 63 with an eccentric 64 carried by bottom shaft 7. This connection is provided with felt 65 (see Fig. 5) for lubricating the eccentric. That part of the connection 63 which operates on the bearing 9 and stitch regulating crank 10,—see Fig. 5,—so as to prevent side shake.

From the foregoing it will be clear that the eccentric gives movement to the connection 63 rocking the lever 57 on the stud 59 so as to give end movement to the link 55 and the yoke 51 thereby to move the looper shafts 40 and 46 endwise in their bearings 42 and 50 and thus cause the loopers to move from the rear of the needles to the front thereof, while they are being rocked into and out of the needle loops by the mechanism hereinbefore described. A portion of the extension 3 has an extending portion 66, affording a seat 67 (see Fig. 1) for one end of the cloth plate, which is in the form of an upright hollow post and has a depending portion 68 and a rounded raised portion 69 affording space for the looper actuating rod 36 to operate thereunder (see Fig. 3). The cloth plate is provided with a vertical wall 70 rounded as at 71 and terminates in a top portion 72, the opposite corner being rounded as at 73 and having an end wall 74 and a depending portion 75 where it is secured to the end wall of the base 1, (see Figs. 1 and 3). The front side of the cloth plate is so shaped as at 76 as to afford space for the looper mechanism and is also inclined as at 77 (see Fig. 2) and terminates in a vertical portion 78. The end 76 and portion 77 of this cloth plate are cut out to receive a slide plate 79 (see Figs. 2 and 8). This permits access to the looper mechanism. This slide plate 79 has two beveled edges 80 in its top portion 81, which slides in grooves 82 (see Fig. 3). The top portion 81 covers the top opening indicated by 83. The rear wall of the cloth plate 84 has an angular portion 85 (see Fig. 2) leaning over the shaft 7 and is also curved inward as at 86 above the axis of the shaft 7 and terminates in a vertical wall 87 to receive the rear end of the throat plate 88 while the forward end 89 of the throat plate rests on the portion 90 of the cloth plate. The needle bar 91 operates in suitable bearings 92 in the head of the machine 6 and carries a needle holder 93 (see Figs. 3 and 12). This needle holder is drilled to receive the two sets of needles 94 and 95. Upon viewing Fig. 12 it will be seen that the needle holder is offset, having the needles 95 set on a line back of the needles 94, that is to say, the two groups of needles are staggered. This is to permit the loopers to operate in close proximity to one another yet in such manner that they will pass each other in their respective movements without interference in the threads they are handling. A presser bar 96 also operates in the head 6 in suitable bearings and carries presser foot 97, having upturned toes 98 and suitable needle openings, 99 and 100 (see Fig. 7). The back of the needle hole openings is provided with a raised portion 101 (see Fig. 7) referred to hereinafter. The presser foot also has attached thereto thread guides 102, the arms of which are attached as at 103 to the presser foot. Each of these thread guides is shown located to one side and slightly to the rear of the needle adjacent thereto, and this enables it to properly coöperate with the thread carrying finger during its movement in a circular path substantially around the path of the needles. The presser foot may be raised in the usual manner by hand or foot lifter and also coöperates with the feed 27 to feed the goods. Attached to the presser bar 96, (see Fig. 3) is a yoke 104 having an arm extending through a guide slot in the head 6. This arm terminates in a laterally extending portion 105, having a part 106, which is part of the supporting bracket for the top cross thread fingers. This bracket extends over to bearings 107 and 108 secured to the presser bar (see Fig. 2). The web 109 of these two bearings, extends outward as at 110 and forms a support for a pin 111 (see Fig. 4) operating in a slot 112 of this web. The outwardly extending portion 113 (see Figs. 2 and 4) of the top bearing 107 is slotted as at 114 to receive a reciprocating toothed rack 115, having teeth 116 co-acting with a pinion 117, while the opposite rack 118 has teeth co-acting with a pinion 119. The rack 118 is cut away as at 120 to clear the teeth of the pinion 117 during its reciprocation. These pinions 117 and 119 are supported by stud screws 121 tapped into the top of the extension 113. Each of the gears is provided with pins 122 (see Figs. 3 and 4), which connect each thread carrier plate 123 with its pinion so as to move therewith. Each of these plates 123 is provided with a depending lug 124 having secured therein the thread carrying finger 125 held by screws 126. Each thread carrying finger has a bend at 127 and a notch at 128 so shaped as to engage a thread and carry it to and underneath the needles which will be described presently. Thus it will be seen that the plane of the middle needle of each set intersects the pivotal axis of a thread finger (see Figs. 2 and 3) so that each thread finger is so supported that it swings about the center of a set of needles or the middle needle of a set of needles. The rack 115, which operates the pinions, is actuated by a link 129 having link pins 130 connecting the rack with a bell crank lever 131 (see Fig. 3), which is pivotally mounted as at 132 to a depending lug 133 carried by the arm 5 of the machine. This lug is located slightly at an angle with respect to the top and bottom shafts of the machine and this angle is approximately on a center line of the axis of the offset needle holder (see Fig. 1). That is to say, the line of reciprocation of the tooth racks is such that the ends 128 of the thread carriers will travel in a circular path around the needles. The circular or oscillating movement of each finger 125 is about three quarters of a circle or practically around its group of needles. The other arm 133' of the bell crank lever is provided with a ball 134 actuated by a connection 135, which connection is operated by an eccentric crank carried by the top shaft of the machine (not shown).

From the foregoing it will be understood that as the top shaft rotates and reciprocates the needles, the bell crank lever is rocked on its stud 132 and so reciprocates the toothed rack carried by the presser bar, and which has a rising and falling movement therewith so that the ends of the thread carriers 125 are always in the same vertical relation with respect to the top of the presser foot feed while their circular oscillating motion is around the needles from a point behind the short needles, operating in front thereof to a position behind the long needles. This motion takes place at each cycle of the machine so that a thread is carried from each of the thread guides 102 so as to pass beneath the two outside needles of each group, the ends of the fingers 125 passing close to the long needles hold the loop of thread open for the entrance of said needle. Immediately after the needles have entered the loop, the fingers or thread carriers return to their first position to receive the next loop of thread (see Figs. 1 and 13). The semi-circular projection 101 (see Fig. 7) located at the back of the needle openings in the presser feet, also acts upon the threads 136 carried by the carriers and insures the carriers picking up the thread in their forward movement and prevents them from dragging the thread backward, and to further insure positive handling of the thread at this point, the carriers are rounded off on the back as indicated by 137, (see Fig. 13).

In Fig. 13 a piece of goods is represented by 138 and the cross stitches by 139, while the needle threads are represented by 140, and Fig. 12 shows how the needle holder 93 is offset for the respective groups of needles. Fig. 11 shows details of the throat plates, one indicated by 141 and the other by 142.

These plates are made separate because the tongues 143 over which the stitches are formed are necessarily delicate and if breakage occurs, it is cheaper to renew than if both plates were made as one piece. These plates are provided with the usual feed slots 144 and a center slot 145'. In order that the loopers may be threaded without difficulty, I have provided the cloth plate with two side openings in the vertical portion thereof, each of which is covered with a hinged cover plate 145 (see Fig. 7) provided with notch 146 to facilitate opening the same. The looper threads 147 are guided by an eyelet 148 (see Fig. 1) to a post 149 and the tensions 150 thence to a forked eyelet 151. A wire 152 carried by the ball joint connection that operates the looper may be used to act as a takeup on the looper threads. Each of the loopers may carry a thread eyelet 153 and by passing the thread from the eyelet on one looper to the opposite looper, these eyelets act to a certain extent as a takeup on the looper threads, affording a simple means for properly handling said threads in the formation of the stitches. The needle threads 140 (see Fig. 1) pass from the tensions 154 to the needle bar eyelets 155 and then directly to the needles, while the top covering threads 136 come from the tensions 156 (see Fig. 1) directly to the guides 102 of the presser foot and then to the thread carrying fingers 125.

Viewing Figs. 7 and 8, it will be seen that a flattened tube 157 is attached to the slide plate 79. The forward end of this tube carries two vertical extending guides 158 which guide the edges 159 (see Fig. 14) forming the shoulders of the shirt. These guides 158 extend up into the cut out portion 160 of the presser feet (see Fig. 7). These guides are so located with respect to the needles as to permit guiding the edges while the bottom strip 161 is led into the flattened tube at 162 (see Fig. 8) and delivered from the end 163 directly to the needles. The top strip 164 (see Fig. 14) may be led in at right angles by the guide wire 165, which is attached to the bracket 113. As this strip 164 passes over this wire, it makes a right angle turn as indicated at 167. The shirt body indicated by 168 and the arm hole 169 (Fig. 14) illustrates the manner in which the goods are handled. The ends 170 are placed in front of the presser foot adjacent the guides 158 and the stitching commences, while the stitching ends on the opposite side of the shirt body at 171 (Fig. 15).

In conclusion, it will be observed that by means of the improved form of cloth plate or work support, which is in the form of a post extending above the base or bed of the machine, the work or garment may be drawn from the rear of the machine to the front thereof and then stitched and fed from the front toward the rear so that when the stitching operation is completed the garment may be dropped from the machine at the rear thereof. To facilitate this mode of operation, the hollow post formed cloth plate has its front and rear walls formed in the manner shown and in the chamber of this post formed cloth plate the looper and feed mechanism are located, all of the looper operating parts being located in front of the stitching mechanism comprising the loopers, needles and thread carriers or fingers. Thus in the present improvement as hereinbefore stated, the goods forming the garment are drawn into the machine from the rear thereof and then fed out underneath the presser foot from front to rear instead of as is usual, being drawn into the machine and under the presser foot from the front of the machine, so that the goods or garment is thus fed off of the machine rather than on to the machine as heretofore, so that the serious objection of commencing each stitching operation by lifting the presser foot and inserting the work is avoided.

In the present improvement it will also be observed that the top covering stitch is made by a single thread carrier or finger and that the thread carriers or fingers are lifted with the presser foot so that they cannot be damaged when the foot is lifted. In other words, these thread carriers or fingers have a rise and fall movement with the presser foot, so that when the foot is lifted the thread fingers are also lifted and liability to injury thereof is thus avoided.

From the foregoing it will be seen that the present improved machine is provided with two spaced sets of multiple needles, each set shown herein as comprising three needles, which sets of needles are spaced or separated a material distance apart as compared with the distance between the needles of each set. Coöperating with each set of needles is a looper and a single thread carrying finger whereby two spaced rows of ornamental covering stitches are obtained on top and bottom of the work. Each of the thread carrying fingers has a movement which is confined close to and around the path of its set of needles, that is to say, its movement is in a circular path almost entirely around the path of its set of needles owing to the fact that the fingers extend lengthwise of the needles and each operates around the center vertical axis of its set of needles, and in operation each thread carrying finger picks up the top ornamental covering thread at each cycle of the machine and carries a loop of this thread around the path of the three needles, that is, across the front of the needle threads, so that such finger thread is stitched down at each reciprocation of the needles.

In the stitching of the shoulder seams of knit underwear or down the legs thereof, etc., the needles must penetrate close to the edges of the fabric to avoid a bulky seam, and as this stitching is across the wales of the knit fabric it is difficult to make a strong seam structure, as the knit stitches of the fabric tend to ravel out and fray. This is prevented in the present improvement because in each instance each needle thread crosses two adjacent strands of the finger thread, which are side by side at the time they are crossed by the needle thread, and this result is obtained in the present improvement by reason of the fact that the thread carrying finger has a circular movement practically around its set of needles. In other words, the finger thread is thoroughly stitched down and there is no chance of raveling the edge of the garment, as is the case where only each alternate loop of the finger thread is stitched down. Furthermore a decided advantage is obtained by the circular movement of the thread carrying finger operating close to the needles in that it obviates the necessity of any thread take-up or pull-off mechanism. The stitch is laid in a natural way and just sufficient thread is drawn out in loop form by the finger to form the stitch. Moreover the movement of the single thread carrying finger in a circular path obviates the necessity of using two or more fingers for if this single thread carrying finger were not moved in a circular path it would be necessary to use a plurality of fingers to accomplish the result of stitching the loops down in the manner shown.

Furthermore by using three needles the seam is made much stronger. In other words, there are three chances of that seam holding because the finger thread is stitched down not only at its two outside edges but along its center or middle, thus making a very strong seam and also a seam with no edges or threads or loops sticking up in position to be caught and broken while the raveling also of the knit fabric is prevented because the fabric is stitched comparatively close together by three lines of stitching.

As just stated, it will be seen that the present improved machine is provided with two spaced sets or groups of needles, each set shown herein as comprising three needles. The work for which this machine is particularly designed could not be done by the use of a pair of needles, and in order to obtain the two ornamental rows of stitches hereinbefore referred to and to do the work for which the machine is designed, it is essential that two groups or two sets of spaced needles be used.

I claim as my invention:

1. In a sewing machine, the combination of stitching mechanism comprising two sets of needles, looper mechanism coöperating with the needles, a single thread carrying finger coöperating with each set of needles, and means for supporting said finger whereby it may swing about a vertical axis located at the center of a set of needles so that it is movable in a circular path practically around the path of the needles.

2. In a sewing machine, the combination of stitching mechanism comprising two sets of needles, a pair of loopers, one coöperating with each set of needles, a single thread carrying finger coöperating with each set of needles, and means for supporting said finger whereby it may swing about a vertical axis located at the center of a set of needles so that it is movable in a circular path substantially around the path of its set of needles.

3. In a sewing machine, the combination of a presser foot bar, work supporting means constructed to permit the work to be drawn from the rear of the machine to the front thereof and then stitched and fed from the front toward the rear thereof whereby the work is fed off of the machine instead of on to the machine, and stitching mechanism comprising feeding mechanism, needle mechanism including a needle bar, looper mechanism and thread finger mechanism, the needle mechanism comprising two groups of three needles each spaced laterally from both of said bars, and the finger mechanism comprising a pair of pick up fingers, one coöperating with each group of needles.

4. In a sewing machine, the combination of work supporting means constructed to permit the work to be drawn from the rear of the machine to the front thereof and then stitched and fed from the front toward the rear thereof whereby the work is fed off of the machine instead of on to the machine, and stitching mechanism comprising feeding mechanism, needle mechanism, looper mechanism comprising a pair of independently supported loopers mounted for movement relatively to each other and thread finger mechanism, the needle mechanism comprising two groups of needles and the finger mechanism comprising a pair of fingers, one coöperating with each group of needles, the groups of needles being located in staggered relation.

5. In a sewing machine, the combination of a stitching mechanism comprising two sets of needles, a pair of loopers, one coöperating with each set of needles, a single thread carrying finger coöperating with each set of needles, and means for supporting it whereby it may swing about the center of a set of needles so that it is movable in a circular path around the path of its set of needles, the organization being such that each thread carrying finger moves in a circular path practically around the path of its set of needles and picks up the top covering thread at each cycle of the machine and carries a loop thereof into the path of its set of needles, so that the thread is stitched down at each reciprocation of the needles.

6. In a sewing machine, the combination of work supporting means constructed to permit the work to be drawn from the rear of the machine to the front thereof and then stitched and fed from the front toward the rear thereof whereby the work is fed off of the machine instead of on to the machine, stitching mechanism comprising feeding mechanism, needle mechanism, looper mechanism and thread finger mechanism, the needle mechanism comprising two groups of needles and the finger mechanism comprising a pair of fingers, one coöperating with each group of needles, the groups of needles being located in staggered relation, means for guiding an understrip to the work, and means for guiding a top strip to the work.

7. In a sewing machine, the combination of work supporting means constructed to permit the work to be drawn from the rear of the machine to the front thereof and then stitched and fed from the front toward the rear thereof whereby the work is fed off of the machine instead of on to the machine, stitching mechanism comprising feeding mechanism, needle mechanism, looper mechanism and thread finger mechanism, the needle mechanism comprising two groups of needles and the finger mechanism comprising a pair of fingers, one coöperating with each group of needles, the groups of needles being located in staggered relation, means for guiding an understrip to the work, means for guiding a top strip to the work, the first guiding means comprising a tubular guide, and a plate carrying the same.

8. In a sewing machine of the class described, the combination of work supporting means, feed mechanism, a pair of stitching mechanisms comprising two sets of at least three needles each, looper mechanism coöperating therewith, means for supplying one or more strips of material to the stitching mechanism for connection simultaneously with the spaced opposed edges of a garment, a single shiftable thread carrying finger coöperating with each set of needles, the organization of the looper mechanism and thread carrying fingers being such that two spaced stitched edges are formed on the top and bottom of the work.

9. In a sewing machine having a bed, the combination of work supporting means comprising a hollow post formed cloth plate projecting above the bed of the machine and effective to permit the work to be drawn from the rear to the front thereof and then stitched and fed from the front thereof toward the rear, and stitching mechanism including looper mechanism located within said hollow post formed cloth plate, said looper mechanism comprising a pair of loopers, parallel shafts for carrying and oscillating said loopers, segmental gears connecting the shafts, means for reciprocating the shafts and means for oscillating said shafts.

10. In a sewing machine having a bed, the combination of work supporting means comprising a hollow post formed cloth plate projecting above the bed of the machine and effective to permit the work to be drawn from the rear to the front thereof and then stitched and fed from the front thereof toward the rear, and stitching mechanism including looper mechanism located within said hollow post formed cloth plate, said looper mechanism comprising a pair of loopers, parallel shafts for carrying and oscillating said loopers, segmental gears connecting the shafts, means for reciprocating the shafts and means for oscillating said shafts, said reciprocating means including a linkage connection and a yoke connected with said shafts.

11. In a sewing machine, the combination of stitching mechanism comprising two sets of needles, a pair of separately mounted opposed loopers, one coöperating with each set of needles, and a single thread carrying finger coöperating with each set of needles, and means for actuating said fingers.

12. In a sewing machine, the combination of stitching mechanism comprising two sets of spaced needles, a pair of separately mounted loopers, one coöperating with each set of needles, the pivotal axis of each looper being substantially intersected by the vertical axis directly between and substantially equidistant from the two outer needles of its set of needles, and means coöperating therewith and comprising a single thread carrying finger coöperating with each set of needles for forming simultaneously two disconnected ornamental rows of covering stitches spaced apart.

13. In a sewing machine, the combination of stitching mechanism comprising two sets of needles, each set comprising at least three needles, a pair of loopers, one coöperating with each set of needles, and a single shiftable thread carrying finger coöperating with each set of needles, the organization being such that each thread carrying finger moves in a circular path practically around the path of its set of needles and picks up the top covering thread at each cycle of the machine and carries a loop thereof into position, so that the thread is stitched down at each reciprocation of the needles.

14. In a sewing machine having a single head, the combination of a presser foot bar, stitching mechanism comprising a needle bar and two sets of needles carried by said needle bar and spaced laterally from both of said bars, each set comprising at least three needles, a pair of loopers, one coöperating with each set of needles, and a single shiftable thread pick up finger coöperating with each set of needles.

15. In a sewing machine, the combination of needle mechanism and looper mechanism, the latter comprising a pair of loopers independently supported in opposition, a pair of shafts for supporting said loopers, means for imparting endwise movement to the shafts, and means for oscillating the loopers.

16. In a sewing machine the combination of work supporting means comprising a hollow upright post formed cloth plate, a plate carried thereby, and a tubular guide carried by said plate, said plate also having a pair of upright guides at one end of said tubular guide.

17. In a sewing machine, the combination of stitching mechanism comprising two offset groups of needles, a presser foot bar, a pair of thread carrying fingers connected with the presser foot bar for rising and falling movement therewith and each coöperating with a group of needles, and means for oscillating said fingers relatively to the needles.

18. In a sewing machine, the combination of stitching mechanism comprising a plurality of needles, a single thread pick-up finger coöperating therewith, and means for supporting and oscillating said finger relatively to the needles whereby it may swing about a vertical axis located at the center of the needles so that it is movable in a circular path substantially around the path of the needles to carry one strand of its loop to the rear of at least one needle.

19. In a sewing machine, the combination of stitching mechanism comprising a plurality of needles, a single thread pick-up finger coöperating therewith, means for supporting and oscillating said finger whereby it may swing about a vertical axis located at the center of the needles so that it is movable in a circular path practically around the path of the needles to carry one strand of its loop to the rear of at least one needle, and a presser foot bar to which the thread carrying finger is connected whereby it has a rising and falling movement with the presser foot bar.

20. In a sewing machine, the combination of stitching mechanism comprising two groups of needles, each comprising a plurality of needles, a pair of thread carrying fingers coöperating one with each group of needles, and means for supporting and oscillating the fingers each relatively to its group of needles whereby it may swing about a vertical axis located at the center of said needle group so that it is movable in a circular path practically around the path of its group of needles.

21. In a sewing machine, the combination of a presser foot bar, stitching mechanism comprising a needle bar and two groups of spaced needles carried by said needle bar and spaced laterally from both of said bars, each comprising a set of at least three needles, a pair of thread pick up fingers coöperating one with each group of needles, and means for oscillating the fingers each relatively to its group of needles.

22. In a sewing machine, the combination of stitching mechanism comprising two groups of needles, each comprising a set of three needles, a pair of thread carrying fingers coöperating one with each group of needles, means for oscillating the fingers each relatively to its group of needles, and a presser foot bar to which the thread carrying fingers are connected whereby they have a rising and falling movement with said bar, the groups of needles being offset relatively to each other.

23. In a sewing machine, the combination of stitching mechanism comprising two groups of needles, each comprising a plurality of needles, a pair of thread carrying fingers coöperating one with each group of needles, means for oscillating the fingers each relatively to its group of needles, and a presser foot bar to which the thread carrying fingers are connected whereby they have a rising and falling movement with said bar, the oscillating means for said thread carrying fingers comprising a gear and rack mechanism.

24. In a sewing machine, the combination of stitching mechanism comprising two groups of needles, each comprising a plurality of needles, a pair of thread carrying fingers coöperating one with each group of needles, means for oscillating the fingers each relatively to its group of needles, a presser foot bar to which the thread carrying fingers are connected whereby they have a rising and falling movement with said bar, the oscillating means for said thread carrying fingers comprising a gear and rack mechanism, and means for reciprocating the rack portion thereof.

25. In a sewing machine, the combination of stitching mechanism comprising two groups of needles, each comprising a plurality of needles, a pair of thread carrying fingers coöperating one with each group of needles, means for oscillating the fingers each relatively to its group of needles, a presser foot bar to which the thread carrying fingers are connected whereby they have a rising and falling movement with said bar, the oscillating means for said thread carrying fingers comprising a gear and rack mechanism, and means for reciprocating the rack portion thereof and including a linkage and a slot and pin connection.

26. In a sewing machine, the combination of stitching mechanism comprising two groups of needles, each comprising a plurality of needles, a pair of thread carrying fingers coöperating one with each group of needles, means for oscillating the fingers each relatively to its group of needles, and a presser foot bar to which the thread carrying fingers are connected whereby they have a rising and falling movement with said bar, the groups of needles being offset relatively to each other, and the means for oscillating the thread carrying fingers being located at an angle to the direction of feed of the work.

27. In a sewing machine, the combination of stitching mechanism comprising a presser foot and its bar, thread guides carried thereby and movable therewith, two groups of staggered needles, a pair of thread carrying fingers one coöperating with each group of needles and connected with the presser foot for rising and falling movement therewith, and means for oscillating the thread carrying fingers.

28. In a sewing machine, the combination of stitching mechanism comprising a presser foot and its bar, thread guides carried thereby and movable therewith, two groups of staggered needles, a pair of thread carrying fingers one coöperating with each group of needles and connected with the presser foot for rising and falling movement therewith, means for oscillating the thread carrying fingers, feeding mechanism and looper mechanism, the latter comprising a pair of loopers projecting toward each other, and means for oscillating and reciprocating the loopers.

29. In a sewing machine the combination of stitching mechanism comprising a presser foot and its bar, thread guides carried thereby and movable therewith, two groups of staggered needles, a pair of thread carrying fingers one coöperating with each group of needles and connected with the presser foot for rising and falling movement therewith, means for oscillating the thread carrying fingers, feeding mechanism and looper mechanism, the latter comprising a pair of loopers projecting toward each other, and means for oscillating and reciprocating the loopers and comprising a pair of segmental gears and a pair of endwise movable shafts carrying the same.

30. In a sewing machine having a single head, the combination of a presser foot bar, stitching mechanism comprising a needle bar and two sets of needles carried by said needle bar and spaced laterally from both of said bars, at least three to a set, looper mechanism coöperating with the needles, and a single thread pick-up finger coöperating with each set of needles, and means for shifting said fingers.

31. In a sewing machine having a single head, the combination of stitching mechanism comprising two sets of needles carried by said head, at least three to a set, the needles of the sets being spaced apart, looper mechanism coöperating with the needles, a single thread carrying finger coöperating with each set of needles, and means for supporting said finger whereby it may swing about a vertical axis located between and substantially equi-distant from the two outer needles and have a circular movement close to and substantially around the path of its set of needles.

32. In a sewing machine having a single head, the combination of a presser foot bar, feeding mechanism, a pair of stitching mechanisms comprising a needle bar and two sets of needles carried by said needle bar and spaced laterally from both of said bars, at least three to a set, looper mechanism coöperating with the needles, and shiftable thread pick-up fingers also coöperating with the needles, the organization being such that two ornamental rows of covering stitches are formed on the top and bottom of the work, said rows being spaced apart.

33. In a sewing machine having a single head, the combination of a presser foot bar, feeding mechanism, a pair of stitching mechanisms comprising a needle bar and two sets of needles carried by said needle bar and spaced laterally from both of said bars, at least three needles to a set, and means coöperating therewith and including thread pick-up means for simultaneously forming two ornamental rows of stitches.

34. In a sewing machine having a single head, the combination of a presser foot bar, feeding mechanism, a pair of stitching mechanisms comprising a needle bar and two sets of needles carried by said needle bar and spaced laterally from both of said bars, at least three needles to a set, and means coöperating therewith and including a single thread pick-up finger for each set of needles for simultaneously forming two ornamental rows of stitches.

35. In a sewing machine having a single head, the combination of feeding mechanism, a pair of stitching mechanisms comprising two sets of needles carried by said head, at least three needles to a set, means coöperating therewith and including a single thread carrying finger for each set of needles, and means for supporting said finger whereby it may swing about a vertical axis located at the center of a set of needles so that it is movable in a circular path practically around the path of its set of needles for simultaneously forming two ornamental rows of stitches.

36. In a sewing machine, the combination of feeding mechanism, a pair of stitching mechanisms comprising two sets of spaced needles, each set comprising at least three needles, means coöperating therewith for simultaneously forming two ornamental rows of stitches and including a single thread carrying finger for each set of needles, and means for shifting each thread carrying finger in a circular path practically around the path of its set of needles, each of said fingers being effective to pick up the top covering thread at each cycle of the machine and carry a loop thereof into position so that said thread will be stitched down at each reciprocation of the needles.

37. In a sewing machine having a single head, the combination of a presser foot bar, feeding mechanism, a pair of stitching mechanisms comprising a needle bar and two sets of multiple needles spaced apart carried by said needle bar and spaced laterally from both of said bars, each set comprising at least three needles, looper mechanism comprising a looper coöperating with each set of needles, a pair of thread pick-up fingers, one coöperating with each set of needles, the organization being such that two spaced rows of ornamental stitches are simultaneously formed along the work.

38. In a sewing machine, the combination of stitching mechanism comprising two sets of spaced needles, at least three to a set, a pair of opposed loopers, one coöperating with each set of needles, and a single thread carrying finger coöperating with each set of needles and movable in a circular path practically around the path of the needles.

39. In a sewing machine, the combination of two sets of needles, a single thread carrying finger coöperating with each set of needles, a presser foot and its bar, means for oscillating said fingers relatively to the needles, and thread guides carried by the presser foot for the threads of the thread carrying fingers.

40. In a sewing machine, the combination of two sets of needles, a single thread carrying finger coöperating with each set of needles, a presser foot and its bar to which said thread carrying fingers are connected for rising and falling movement therewith, means for oscillating said fingers relatively to the needles, thread guides carried by the presser foot for the threads of the thread carrying fingers, and means for guiding a strip to the needles.

41. In a sewing machine, the combination of needle mechanism and looper mechanism, the latter comprising a pair of loopers oscillating toward and from each other, a pair of shafts for supporting said loopers, means for imparting endwise movement to the shafts, and means for connecting the shafts and comprising a pair of segmental gears.

42. In a sewing machine, the combination of needle mechanism and looper mechanism, the latter comprising a pair of loopers oscillating toward and from each other. a pair of shafts for supporting said loopers, means for imparting endwise movement to the shafts, and means for connecting the shafts and comprising a pair of segmental gears, one having parts thereof overlapping the other.

43. In a sewing machine, the combination of needle mechanism and looper mechanism, the latter comprising a pair of loopers oscillating toward and from each other, a pair of shafts for supporting said loopers, means for imparting endwise movement to the shafts, means for connecting the shafts and comprising a pair of segmental gears, one having parts thereof overlapping the other, and link and yoke mechanism for shifting said shafts endwise.

44. In a sewing machine, the combination of needle mechanism and looper mechanism, the latter comprising a pair of loopers oscillating toward and from each other, a pair of shafts for supporting said loopers, means for imparting endwise movement to the shafts, means for connecting the shafts and comprising a pair of segmental gears, one having parts thereof overlapping the other, link and yoke mechanism for shifting said shafts endwise, a bottom shaft, gearing connected therewith for oscillating the loopers, and means connected with said bottom shaft for shifting the shafts endwise.

45. In a sewing machine having a driving shaft, the combination of needle mechanism and looper mechanism, the latter comprising a pair of loopers, a pair of endwise shiftable shafts extending transversely of said driving shaft and carrying the loopers, segmental gears between said shafts for connecting the shafts and thereby the loopers, means for shifting said shafts endwise, and means for oscillating said loopers.

46. In a sewing machine, the combination of needle mechanism and looper mechanism, the latter comprising a pair of loopers, a pair of endwise shiftable shafts carrying the loopers, segmental gears between said shafts for connecting the shafts and thereby the loopers, means for shifting said shafts endwise. means for oscillating said loopers, and a cloth supporting plate comprising a hollow post having the looper mechanism located therein.

47. In a sewing machine, the combination of needle mechanism and looper mechanism, the latter comprising a pair of loopers, a pair of endwise shiftable shafts carrying the loopers, segmental gears between said shafts for connecting the shafts and thereby the loopers, means for shifting said shafts endwise, means for oscillating said loopers, a cloth supporting plate comprising a hollow post having the looper mechanism located therein, said post having an opening at one side and top for access to the looper mechanism and a removable plate closing said opening.

48. In a sewing machine, the combination of needle mechanism and looper mechanism, the latter comprising a pair of loopers, a pair of endwise shiftable shafts carrying the loopers, segmental gears between said shafts for connecting the shafts and thereby the loopers, means for shifting said shafts endwise, means for oscillating said loopers, a cloth supporting plate comprising a hollow post having the looper mechanism located therein, said post having an opening at one side and top for access to the looper mechanism, a removable plate closing said opening, said plate comprising a top and a depending portion, and a tubular guide carried by the top portion thereof.

49. In a sewing machine, the combination of needle mechanism and looper mechanism, the latter comprising a pair of loopers, a pair of endwise shiftable shafts carrying the loopers, segmental gears between said shafts for connecting the shafts and thereby the loopers, means for shifting said shafts endwise, means for oscillating said loopers, a cloth supporting plate comprising a hollow post having the looper mechanism located therein, said post having an opening at one side and top for access to the looper mechanism, a removable plate closing said opening, said plate comprising a top and a depending portion, a tubular guide carried by the top portion thereof, and a pair of upstanding guides carried in front of said tubular guide.

50. In a sewing machine, the combination of needles, presser foot mechanism and thread carrying finger means, the latter carried by the presser foot mechanism for rising and falling movement therewith, and means for oscillating said thread carrying finger means relatively to the needles in a circular path substantially around the path of the needles.

51. In a sewing machine, the combination of needle mechanism, presser foot mechanism and thread carrying finger means, the latter carried by the presser foot mechanism for rising and falling movement therewith, and means for oscillating said thread carrying finger means in a circular path substantially around the path of the needles, the needle mechanism comprising two groups of needles and the thread carrying finger mechanism comprising a pair of fingers, one coöperating with each group of needles.

52. In a sewing machine, the combination of needle mechanism, presser foot mechanism and thread carrying finger means, the latter carried by the presser foot mechanism for rising and falling movement therewith, and means for oscillating said thread carrying finger means relatively to the needles, the needle mechanism comprising two groups of needles and the thread carrying finger mechanism comprising a pair of fingers, one coöperating with each group of needles, the groups of needles being located in staggered relation.

53. In a sewing machine, the combination of needle mechanism, presser foot mechanism and thread carrying finger means, the latter carried by the presser foot mechanism for rising and falling movement therewith, means for oscillating said thread carrying finger means relatively to the needles, the needle mechanism comprising two groups of needles and the thread carrying finger means comprising a pair of fingers one coöperating with each group of needles, the groups of needles being located in staggered relation, and thread guides carried by the presser foot mechanism for guiding the threads to the thread carrying fingers.

54. In a sewing machine, the combination of needle mechanism, presser foot mechanism and thread carrying finger means, the latter carried by the presser foot mechanism for rising and falling movement therewith, and means for oscillating said thread carrying finger means, relatively to the needles, the needle mechanism comprising two groups of needles and the thread carrying finger mechanism comprising a pair of fingers one coöperating with each group of needles, the groups of needles being located in staggered relation, said thread carrying finger mechanism being located at an angle to the feed of the work.

55. In a sewing machine, the combination of needle mechanism, presser foot mechanism and thread carrying finger means, the latter carried by the presser foot mechanism for rising and falling movement therewith, means for oscillating said thread carrying finger means relatively to the needles, said presser foot mechanism having needle openings and means located at the back thereof and projecting above the presser foot for coöperating with the thread carrying finger means.

56. In a sewing machine, the combination of means for supporting the work with its edges spaced apart, two sets of spaced needle mechanism, presser foot mechanism, thread carrying fingers coöperating with the needle mechanisms, means for oscillating said thread carrying fingers relatively to the needles, and means for guiding a pair of strips to the spaced edges of the work, one above and the other below the work.

57. In a sewing machine, the combination of means for supporting the work with its edges spaced apart, two sets of spaced needle mechanisms, presser foot mechanism, thread carrying fingers coöperating with the needle mechanisms, means for oscillating said thread carrying fingers relatively to the needles, and means for guiding a pair of strips to the spaced edges of the work, one above and the other below the work, one of said guiding means comprising a tubular guide, a plate carrying said tubular guide, said work supporting means including a pair of upright guides carried by said plate for guiding the work.

58. In a sewing machine, the combination of stitching mechanism comprising two groups of needles, feed mechanism, looper mechanism, presser foot mechanism, thread carrying fingers, one coöperating with each group of needles and supported by the presser foot mechanism for rising and falling movement therewith, means for oscillating the thread carrying fingers relatively to the needles, a work support, a plate carried thereby, means carried by the plate for guiding the work, means carried by the plate for guiding a strip to the work, and means for also guiding another strip to the work.

59. In a sewing machine the combination of stitching mechanism comprising two groups of needles, feed mechanism, looper mechanism, presser foot mechanism, thread carrying fingers, one coöperating with each group of needles and supported by the presser foot mechanism for rising and falling movement therewith, means for oscillating the thread carrying fingers relatively to the needles, a work support, a plate carried thereby, means carried by the plate for guiding the work, means carried by the plate for guiding a strip to the work. and means for also guiding another strip to the work, said work support comprising a hollow post extending above the bed of the machine and in which the looper mechanism is located and access to which is obtained by shifting the plate.

60. In a sewing machine, the combination of feeding mechanism, needle mechanism, looper mechanism, and a single thread pickup finger coöperating with the needle mechanism for making a top covering stitch, and means for supporting and operating said finger whereby it may swing about a vertical axis located at the center of the needle mechanism so that it is movable in a circular path substantially around the path of the needles.

61. In a sewing machine, the combination of feeding mechanism, needle mechanism comprising two groups of needles, looper mechanism comprising separately mounted opposed loopers, a single thread carrying finger coöperating with each group of needles, and means for oscillating said fingers.

62. In a sewing machine, the combination of feeding mechanism, needle mechanism comprising two groups of needles, looper mechanism comprising a pair of independently supported loopers mounted for movement relatively to each other, a single thread carrying finger coöperating with the needles of each group, and means for oscillating said fingers.

63. In a sewing machine, the combination of feeding mechanism, needle mechanism comprising two groups of needles, looper mechanism comprising a pair of opposed independently supported loopers, a single thread carrying finger cooperating with the needles of each group, and means for oscillating said fingers, each in a circular path practically around the path of its group of needles.

64. In a sewing machine, the combination of work supporting means effective to permit the work to be drawn from the rear to the front thereof and then stitched and fed therefrom at the rear, means for guiding a strip under the seam, means for guiding a strip to the top of the seam, means for stitching the strips to the seam and comprising two groups of needles one for each edge of the strips, feed mechanism, looper mechanism, a single thread carrying finger cooperating with each set of needles, means for oscillating the fingers each relatively to its group of needles and comprising rack supported means, and a presser foot bar supporting said rack supported means whereby the presser fingers have a rising and falling movement with the presser foot bar.

65. In a sewing machine, the combination of work supporting means effective to permit the work to be drawn from the rear to the front thereof and then stitched and fed therefrom at the rear, means for guiding a strip under the seam, means for guiding a strip to the top of the seam, means for stitching the strips to the seam and comprising two groups of needles one for each edge of the strips, feed mechanism, looper mechanism, a single thread carrying finger cooperating with each set of needles, means for oscillating the fingers each relatively to its group of needles and comprising rack supported means, a presser foot bar supporting said rack supported means whereby the presser fingers have a rising and falling movement with the presser foot bar, said rack supported means being located at an angle to the feed of the work.

66. In a sewing machine of the class described, the combination of work supporting means effective to support the work with its seam edges spaced apart, two groups of needles, a pair of loopers cooperating one with each group of needles, a pair of oscillatory thread carrying fingers one cooperating with each group of needles, and means for guiding a strip of material to the needles for connection simultaneously with the opposed spaced edges of a garment supported on said work supporting means.

67. In a sewing machine of the class described, the combination of work supporting means, two groups of needles, a pair of independently mounted loopers cooperating one with each group of needles, a pair of oscillatory thread carrying fingers one cooperating with each group of needles, and means for guiding a strip of material to the needles for connection simultaneously with the opposed edges of a garment supported on said work supporting means.

68. In a sewing machine of the class described, the combination of work supporting means, two groups of needles, a pair of loopers cooperating one with each group of needles, a pair of oscillatory thread carrying fingers, one cooperating with each group of needles, and means for guiding a pair of strips of material to the needles for connection simultaneously to the opposed edges of the garment supported on the work supporting means.

69. In a sewing machine of the class described, the combination of a pair of spaced needle mechanisms, a presser foot bar, a thread carrying finger connected with said bar for rising and falling movement therewith and cooperating with each needle mechanism, and gear mechanism for operating said fingers relatively to the needle mechanisms.

70. In a sewing machine, the combination of work supporting means effective to support the work with its seam edges spaced apart, means for guiding a strip to the underpart of the seam, means for guiding a strip to the top of the seam, means for stitching the strips to the seam and comprising two groups of spaced needles, one for each edge of the strips, feed mechanism and looper mechanism, a single thread carrying finger cooperating with each set of needles, and means for oscillating the fingers each relatively to its group of needles.

71. In a sewing machine, the combination of feeding mechanism, stitching mechanism comprising two spaced groups of at least three needles each, looper mechanism, and a single rising and falling and oscillatory thread carrying finger cooperating with each group of needles.

72. In a sewing machine, the combination of supporting means effective to support the work with its edges spaced apart, feeding mechanism, stitching mechanism comprising two spaced groups of at least three needles each, looper mechanism, a single rising and falling and oscillatory thread carrying finger cooperating with each group of needles, and means for guiding a strip of material to the spaced edges of the work.

73. In a sewing machine of the class described, the combination of needle mechanism, feed mechanism and looper mechanism comprising a pair of loopers, a pair of parallelly located oscillatory shafts extending toward the front of the machine, means for shifting said shafts endwise, means for oscillating one of the shafts, and means connecting said shafts whereby both will be oscillated simultaneously by the same means.

74. In a sewing machine of the class described, the combination of needle mechanism, feed mechanism and looper mechanism comprising a pair of loopers, a pair of parallelly located oscillatory shafts extending toward the front of the machine, means for shifting said shafts endwise, means for oscillating one of the shafts, and means connecting said shafts whereby both will be oscillated simultaneously by the same means, said connecting means comprising a pair of segmental gears.

75. In a sewing machine of the class described, the combination of needle mechanism, feed mechanism and looper mechanism comprising a pair of loopers, a pair of parallelly located oscillatory shafts extending toward the front of the machine, means for shifting said shafts endwise, means for oscillating one of the shafts, and means connecting said shafts whereby both will be oscillated simultaneously by the same means, said connecting means comprising a pair of segmental gears, one having a part overlapping the other.

76. In a sewing machine, the combination of two sets of needles, a pair of thread carrying fingers one coöperating with each set of needles, gearing for oscillating the thread carrying fingers relatively to the needles, a pair of loopers one coöperating with each set of needles, means for shifting the loopers in one direction, and means for oscillating the loopers and including gearing.

77. In a sewing machine, the combination of a driving shaft, needle mechanism and feed mechanism, looper mechanism comprising a pair of loopers, a pair of endwise shiftable shafts carrying said loopers and extending transversely of the driving shaft, means connected with the driving shaft for shifting said looper shafts endwise, and means connected with the driving shaft for oscillating said looper shafts and thereby the loopers.

78. In a sewing machine, the combination of a driving shaft, needle mechanism and feed mechanism, looper mechanism comprising a pair of loopers, a pair of endwise shiftable shafts carrying said loopers and extending transversely of the driving shaft, means connected with the driving shaft for shifting said looper shafts endwise, means connected with the driving shaft for oscillating said looper shafts and thereby the loopers, and segmental gears connecting said looper shafts.

79. In a sewing machine, the combination of a presser foot bar, a needle bar, a single needle carrier carried by said needle bar, two spaced groups of at least three needles each carried by said needle bar and spaced laterally from both of said bars, a pair of thread pick up fingers coöperating one with each group of needles, and means for oscillating said thread pick up fingers.

80. In a sewing machine, the combination of a single needle carrier, two groups of spaced needles carried thereby, a pair of thread carrying fingers coöperating one with each group of needles, means for oscillating each of said thread carrying fingers in a circular path substantially around the path of its group of needles, a presser foot mechanism, and means connecting the thread carrying fingers with the presser foot mechanism for rising and falling movement therewith.

81. A shiftable plate for a sewing machine comprising a top portion and a depending portion, said top portion having a tubular strip guide and an upwardly projecting work guide at one end of said strip guide for maintaining the seam edges of the work spaced apart.

82. A shiftable plate for a sewing machine having a tubular strip guide supported thereby and a pair of upstanding work guides at one end of said strip guide for maintaining the seam edges of the work spaced apart.

83. In a sewing machine of the class described, the combination of a needle, a presser foot bar, a thread carrying finger connected with said bar for movement therewith, means for supporting the thread carrying finger for oscillating movement in a circular path substantially around the path of the needle, and gear and rack mechanism for oscillating said finger.

84. In a sewing machine, the combination of supporting means effective to support the work with its edges spaced apart, feeding mechanism, stitching mechanism comprising two spaced groups of at least three needles each, looper mechanism, a single rising and falling and oscillatory thread carrying finger coöperating with each group of needles, means for oscillating the fingers in a circular path substantially around the path of the needles, and means for guiding a strip of material to the spaced edges of the work.

85. In a sewing machine, the combination of work supporting means effective to support the work with its edges spaced apart, feeding mechanism, stitching mechanism comprising two groups of at least three needles each, looper mechanism, a single rising and falling and oscillatory thread carrying finger coöperating with each group of needles, and means for guiding a pair of strips of material to the work, one under and the other over the spaced edges of the work.

86. In a sewing machine, the combination of work supporting means effective to support the work with its edges spaced apart, feeding mechanism, stitching mechanism comprising two groups of spaced needles, looper mechanism, a single rising and falling and oscillatory thread carrying finger coöperating with each group of needles, means for guiding a strip of material to the work under the same, and means for guiding a pair of strips of material to the spaced edges, one strip above the same and the other below the same, one of said means comprising means for turning the strip at right angles to its original direction of movement.

87. In a sewing machine, the combination of work supporting means effective to support the work with its edges spaced apart, feeding mechanism, stitching mechanism comprising two groups of spaced needles, looper mechanism, a single rising and falling and oscillatory thread carrying finger coöperating with each group of needles, and means for guiding a pair of strips of material to the spaced edges, one strip above the same and the other below the same, one of said means comprising means for turning the strip at right angles to its original direction of movement, said turning means being supported by the thread carrying finger supporting means.

88. In a sewing machine, the combination of stitching mechanism comprising a group of at least three needles, a single thread carrying finger coöperating therewith, means for supporting and oscillating said finger whereby it may swing about a vertical axis located between and substantially equidistant from the two outer needles so that it is movable in a circular path practically around the path of the needles, and a presser foot bar to which the thread carrying finger is connected whereby it has a rising and falling movement with said bar.

89. In a sewing machine the combination of needle mechanism comprising two groups of needles, the groups being located in relative staggered relation and the needles of each group having their points located one above another, looper mechanism, feed mechanism, a pair of oscillatory thread carrying fingers one coöperating with each group of needles, and means for oscillating said fingers.

90. In a sewing machine, the combination of work supporting means comprising a hollow upright post formed cloth plate having openings at its opposite sides, at its top and front, cover plates covering the side openings, a sliding plate having a depending portion covering the top and front opening, and a strip guide carried by said sliding plate, said plate also having upstanding projections at one end of said strip guide.

91. In a sewing machine, the combination of stitching mechanism comprising two groups of spaced needles, a pair of independently mounted loopers, one coöperating with each set of needles, a single thread carrying finger coöperating with each set of needles, means for oscillating it relatively to its group of needles, a presser foot, and a pair of thread guides carried by said presser foot, one for each thread carrying finger.

92. In a sewing machine, the combination of stitching mechanism comprising two groups of spaced needles, a pair of independently mounted loopers, one coöperating with each set of needles, a single thread carrying finger coöperating with each set of needles, means for oscillating it relatively to its group of needles, a presser foot, and a pair of thread guides carried by said presser foot, one for each thread carrying finger, said presser foot also having needle openings and an upstanding projection at the rear of each opening.

93. In a sewing machine, the combination of a needle mechanism and looper mechanism, the latter comprising a pair of loopers independently supported in opposition, a pair of shafts for supporting said loopers, means for imparting endwise movement to the shafts, means for oscillating the loopers and comprising means connecting the shafts, and means connected with one of said shafts thereby to rock both of the shafts.

94. In a sewing machine having a driving shaft, looper mechanism comprising a pair of sliding looper carrying shafts extending transversely of said driving shaft, means connecting the driving shaft with the looper shafts whereby the looper shafts are shiftable endwise, and means for imparting oscillatory movement to the loopers and comprising means connected with one of the shafts and means connecting said shafts together for simultaneous movement.

95. In a chain stitch sewing machine, the combination of two spaced sets of multiple needles, looper mechanism coöperating therewith, feeding mechanism, and a single thread pick up finger coöperating with each of said sets of needles, the organization being such that each two adjacent strands of the finger thread are stitched down by a needle thread and two thread-disconnected structurally formed ornamental spaced apart rows of chain stitches are formed.

96. The combination of a work support, a presser foot, a presser bar carrying said foot, a feeding mechanism, two spaced sets of needles, the needles of each set being arranged in a plane at right angles to the line of feed, a fixed thread guide carried by the presser foot and disposed at one side of each set of needles and slightly in rear of the plane of the needles, a thread hook for each set of needles connected with the presser bar and movable to engage a cross thread extending through said fixed thread guide and back therefrom for forming a loop in the cross thread, said hook and stationary thread guide being so disposed relative to its set of needles as to position the loop in the cross thread for the needle farthest removed from the thread guide.

97. The combination of a work support, a presser foot, a presser bar carrying said foot, a feeding mechanism, two spaced sets of needles, the needles of each set being arranged in a plane at right angles to the line of feed, each set comprising a series of not less than three needles, a fixed thread guide carried by the presser foot and disposed at one side of each set of needles and slightly in rear of the plane of the needles, a thread hook for each set of needles connected with the presser bar and movable to engage a cross thread extending through said fixed thread guide and back therefrom for forming a loop in the cross thread, said hook and stationary thread guide being so disposed relative to its set of needles as to position the loop in the cross thread for the needle farthest removed from the thread guide.

Signed at Nyack, N. Y., this 13th day of July, one thousand nine hundred and seventeen.

JOHN P. WEIS.